Fig. 1. DI-ISOPROPYL-DI-TRIETHANOLAMINE ORTHOTITANATE.

A = 20% AQUEOUS NEUTRALIZED SOLUTION.
B = 10% AQUEOUS NEUTRALIZED SOLUTION, STABILIZED WITH FIVE MOLES UREA PER MOLE TITANIA.

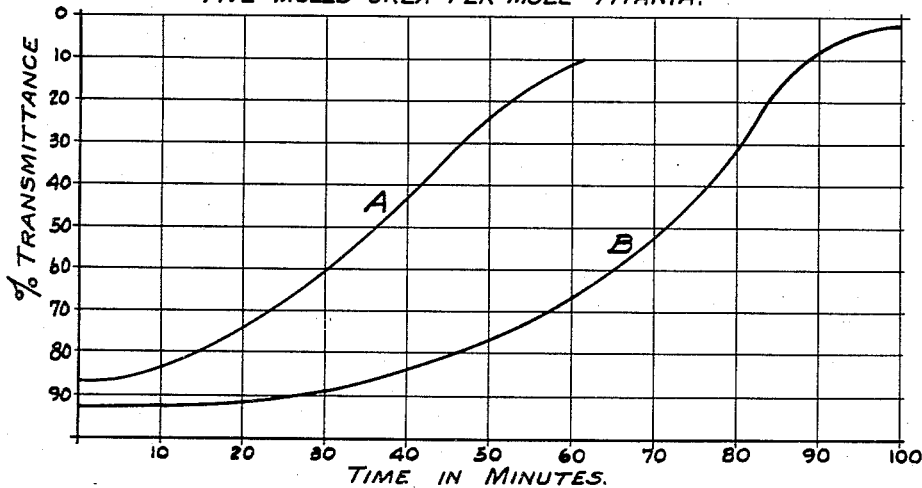

Fig. 2. DI-ISOPROPYL-DI-TRIETHANOLAMINE ORTHOTITANATE.

A = 20% AQUEOUS NEUTRALIZED SOLUTION;
B = AS STABILIZED WITH 0.8 MOLES DEXTROSE PER MOLE TITANIA.
C = AS STABILIZED WITH 0.8 MOLES LACTOSE PER MOLE TITANIA.

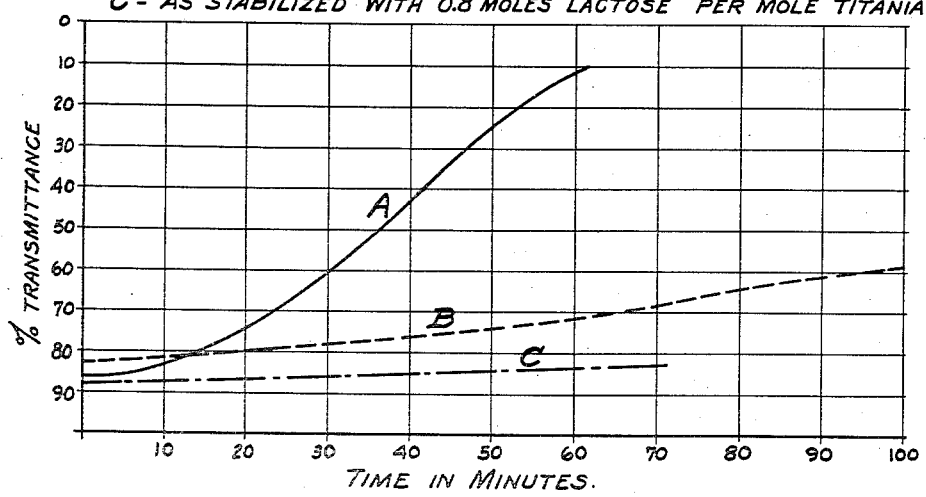

INVENTOR.
PAUL LAGALLY
BY
Morgan, Finnegan, Durham & Pine
ATTORNEYS.

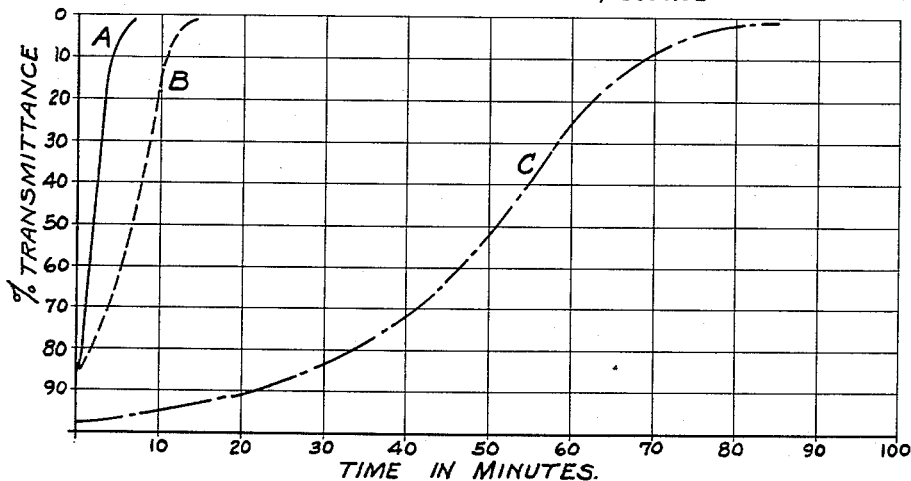

*Fig. 3* DI-ISOPROPYL-DI-TRIETHANOLAMINE ORTHOTITANATE
(10% AQUEOUS NEUTRALIZED SOLUTION)

A = AS STABILIZED WITH 0.8 MOLES DEXTROSE PER MOLE TITANIA.
B = " " " 0.8 " LACTOSE " " " .
C = " " " 0.8 " METHYLGLUCOSIDE " " " .

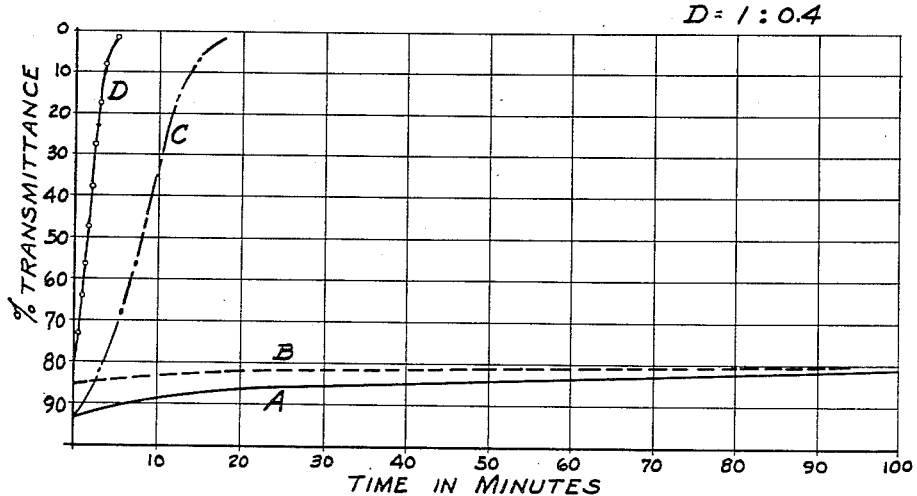

*Fig. 4* DI-ISOPROPYL-DI-TRIETHANOLAMINE ORTHOTITANATE
(10% AQUEOUS NEUTRALIZED SOLUTION) STABILIZED
WITH DIFFERENT AMOUNTS OF MANNOSE:

MOLE RATIO, TITANIA TO MANNOSE:
A = 1 : 0.8
B = 1 : 0.6
C = 1 : 0.5
D = 1 : 0.4

INVENTOR.
PAUL LAGALLY.
BY
ATTORNEYS.

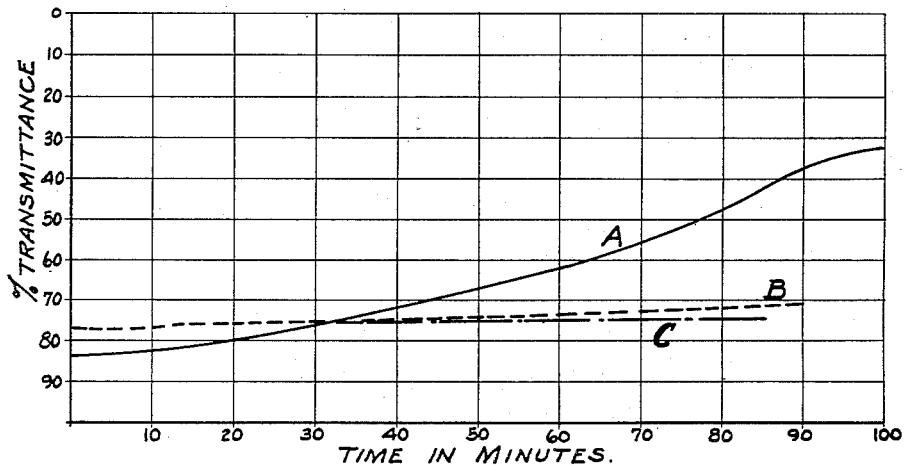

Fig. 5 LOBRY DE BRUYN TRANSFORMATION
20% AQUEOUS SOLUTION OF
DI-ISOPROPYL-DI-TRIETHANOLAMINE ORTHOTITANATE
STABILIZED WITH GLUCOSE (MOLE RATIO; TITANIA TO GLUCOS = 1:1)
A = NEUTRALIZED IMMEDIATELY; B = AFTER ONE DAY; C = AFTER TWO DAYS.

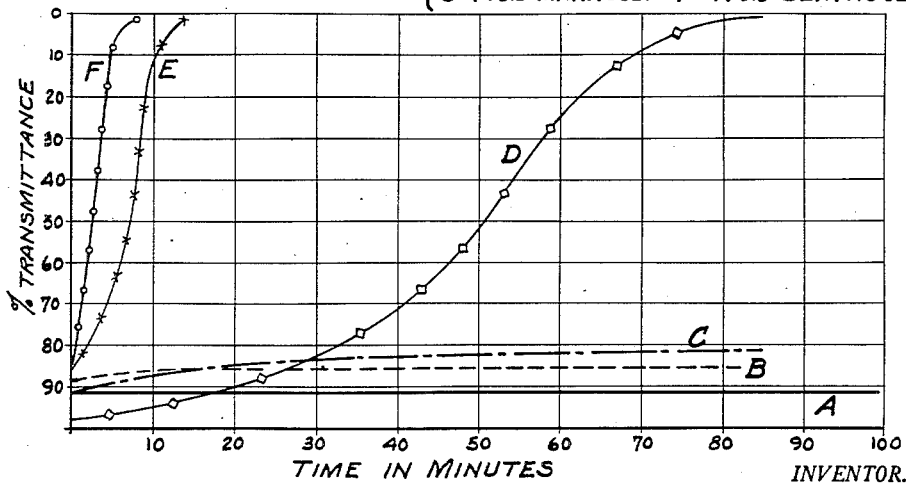

Fig. 6 DI-ISOPROPYL-DI-TRIETHANOLAMINE ORTHOTITANATE
(10% AQUEOUS NEUTRALIZED SOLUTION)
STABILIZED WITH POLYHYDRIC ALCOHOLS AS COMPARED WITH SUGARS:

MOLE RATIO; TITANIA TO ADDITIVE
- A = 1:1 SORBITOL.   D = 1:0.8 METHYLGLUCOSIDE
- B = 1:1 MANNITOL.   E = 1:0.8 LACTOSE
- C = 1:0.8 MANNOSE.  F = 1:0.8 DEXTROSE

INVENTOR.
PAUL LAGALLY
BY
ATTORNEYS.

United States Patent Office 2,950,174
Patented Aug. 23, 1960

2,950,174

PREPARATION AND STABILIZATION OF WATER SOLUBLE REACTIVE TITANIUM DERIVATIVES

Paul Lagally, Sunset Ave., Pleasant Gap, Pa.

Filed Apr. 5, 1956, Ser. No. 576,498

12 Claims. (Cl. 23—202)

The present invention relates to the preparation and stabilization of water soluble titanium derivatives. More particularly this invention pertains to a novel process for effectuating a controlled hydrolysis of water soluble titanium derivatives and in particular to water soluble orthotitanates and to novel products produced by said process.

Orthotitanic acid does not exist in ordinary form as a monomer because of its unstable character which on formation causes it to rapidly form a polymer. This rapid polymerization of the orthotitanic acid is due to its structural arrangement wherein the large titanium ion exhibits an excess charge of four and a coordination number of six with respect to oxygen. Accordingly, in order to satisfy the coordination requirements of the titanium ion, the monomer acid on formation immediately polymerizes to form water insoluble polymers. In like manner, many other titanium derivatives behave similarly to orthotitanic acid. For example, certain orthotitanates or esters of orthotitanic acid are very sensitive to moisture and are hydrolyzed to form polymeric products. For example, ethylorthotitanate on initial formation immediately polymerizes to a trimer solid while the analogous ethyl orthosilicate is a monomer liquid of low viscosity.

Objects and advantages of the invention will be set forth in part hereinafter and in part will be obvious herefrom, or may be learned by practice with the invention, the same being realized and attained by means of the processes, steps and compositions pointed out in the appended claims.

The invention consists in the novel processes, steps and compositions herein shown and described.

Accordingly, it is an object of this invention to provide a novel process for controlling the hydrolysis of water soluble titanium derivatives in order to produce stable monomers or low polymers of orthotitanic acid and esters of orthotitanic acid. A further object of this invention is to provide a novel process for the preparation and stabilization of water soluble titanium derivatives whereby novel aqueous solutions are provided wherein orthotitanic acid and esters of said acid are in a highly reactive form. A still further object of this invention is to provide novel titanium products produced in accordance with the processes set forth in the foregoing objects.

Figs. 1 to 6 illustrate graphically the light transmittance and time of a number of compositions prepared in accordance with this invention.

It has been found that the foregoing objects of the invention may be realized by delaying or suppressing the hydrolysis and polymerization of a water soluble orthotitanate in a novel manner. The water soluble orthotitanates used in accordance with this novel method are chelated esters having the formula

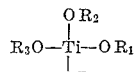

wherein $R_1$, $R_2$, $R_3$ and $R_4$ are ester forming radicals and wherein at least one said radical contains an electron donating atom.

Orthotitanates having the above formula hydrolyze in a manner expressed by the following equation:

$$Ti(OR)_4 + aH_2O \rightarrow Ti(OH)_a(OR)_{4-a} + aROH$$

As the hydrolysis progresses, the water solubility of the products formed decreases due to the formation of metatitanic and titanium dioxide by polymerization and condensation.

$$xTi(OH)_4 \rightarrow [TiO(OH)_2]x + xH_2O$$
$$[TiO(OH)_2]x \rightarrow (TiO_2)_x + xH_2O$$

The products of hydrolysis which are monomer or low polymer derivatives of orthotitanic acid have an exceedingly higher reactivity than precipitated titania formed by polymerization. Thus, by delaying the hydrolysis and polymerization of water soluble titanium esters it is possible to produce a highly reactive form of monomer or low polymer orthotitanic acid or partially hydrolyzed esters of orthotitanic acid. In general, it has been found that stable aqueous solutions of reactive titania in the form of a monomer or low polymer of orthotitanic acid or partially hydrolyzed ester thereof can be prepared by hydrolyzing an orthotitanate of the type indicated above under controlled conditions so that precipitation of the hydrolyzed product is prevented.

The particular conditions employed in hydrolyzing the orthotitanate and maintaining the hydrolyzed product in solution will depend upon the characteristics of the particular orthotitanate that is being hydrolyzed. In general orthotitanates which are highly unstable in water solution require no hydrolyzing agent. Moreover aqueous medium to which they are added must contain a stabilizer before the orthotitanate is added thereto if precipitation of the hydrolyzed product is to be avoided. On the other hand, orthotitanates which are relatively stable in aqueous medium require the addition of a hydrolyzing agent, such as an acid or an alkali, to effect hydrolysis. Moreover, a stabilizer does not have to be present when the stable orthotitanate is initially added to water. The stabilizer need only be present when hydrolysis is initiated by a hydrolyzing agent in order to control the hydrolysis and polymerization of the hydrolyzed product.

It has been found that the stability of an orthotitanate is related to its electron donating capacity. Orthotitanates containing nitrogen atoms are normally stable as they possess a high electron donating capacity. Sulfur atoms exhibit a lower electron donating capacity than nitrogen while oxygen atoms have an even smaller capacity.

As indicated, heretofore, the orthotitanates hydrolyzed in accordance with this invention are water soluble chelated esters. They can be prepared in any conventional manner such as by the production of chelated esters by alcoholysis of alkyl titanates with higher boiling alcohols having electron donating groups such as nitrogen, sulfur or oxygen. These water soluble titanate esters may contain alkyl, aryl, aralkyl groups which may carry inorganic and organic substituents.

Preferably, the orthotitanates to be hydrolyzed in accordance with this invention are those which are relatively stable in aqueous medium and which require a hydrolyzing agent, such as an acid or alkali, for hydrolysis thereof. Examples of preferred orthotitanates are those of the chelated type as illustrated by esters containing:

(1) Two, three or four ligands containing basic nitrogen. Chelated esters of this type are, for example, isopropyl-tri-triethanolamine orthotitanate, di-isopropyl-di-triethanolamine orthotitanate, di-isopropyl-di-diethanolamine orthotitanate, tetra-cyanoethyldiethanolamine orthotitanate.

(2) Less than two ligands containing basic nitrogen and in addition other ligands containing electron-donating groups. Water-soluble esters of this type are, for example, tri-cyanoethyl-mono-triethanolamine orthotitanate, triethyleneglycol-mono-triethanolamine orthotitanate.

As indicated heretofore, orthotitanates which are relatively stable in aqueous medium and of the type indicated by the preferred esters require the addition of a suitable hydrolyzing agent for the hydrolysis thereof to occur. Moreover, the hydrolyzing agent must be of such nature that it will not form a stable titanium complex with the hydrolyzed product. Examples of acids which are not useful as hydrolyzing agents in accordance with this invention because they form stable titanium complexes are—
(1) hydroxy acids containing a hydroxy group in the alpha or beta position such as lactic acid or tartaric acid; (2) lower aliphatic dicarboxylic acids such as oxalic acid and malonic acid and (3) hydro-fluoric acid.

Specific examples of acids which may be used as a hydrolyzing agent in accordance with this invention are:

| Acid | Formula |
| --- | --- |
| Hydrochloric | HCl |
| Hydrobromic | HBr |
| Perchloric | $HClO_4$ |
| Sulfuric | $H_2SO_4$ |
| Phosphoric | $H_3PO_3$ |
| Boric | $H_3BO_3$ |
| Formic | HCOOH |
| Acetic | $CH_3COOH$ |
| Trifluoroacetic | $CF_3COOH$ |
| Perfluorobutyric | $C_3F_7COOH$ |
| Cyanoacetic | $CH_2CNCOOH$ |
| Chloroacetic | $CH_2ClCOOH$ |
| Trichloroacetic | $CCl_3COOH$ |
| Maleic Fumaric | $(CHCOOH)_2$ |
| Succinic | $(CH_2COOH)_2$ |
| Polyacrylic | $(CH_2CHCOOH)n$ |
| Thioglycolic | $CH_2COOH$ |
| Thiomalic | $CH_2COOH$ <br> $\|$ <br> $CSHCOOH$ |
| Carboxymethyl-mercapto-succinic | $CH_2COOH$ <br> $\|$ <br> $S$ <br> $\|$ <br> $CHCOOH$ <br> $\|$ <br> $CH_2COOH$ |
| Toluene sulfonic | $CH_3C_6H_4SO_3H$ |
| Sulfanilic | $NH_2C_6H_4SO_3H$ |

In addition to acids, bases may be used as hydrolyzing agents for certain of the orthotitanates. Examples of suitable bases for this purpose are sodium hydroxide, potassium hydroxide and nitrogen containing bases such as ammonium hydroxide, ethyl amine, diethyl amine, pyridine, piperidine and cyclohexylamine.

As indicated heretofore, a stabilizer is employed for controlling the hydrolysis of the orthotitanate and for preventing the precipitation of the hydrolyzed product from the aqueous solution. The stabilizer contains electron donating groups for temporarily screening the orthotitanic acid or ester to prevent polymerization thereof and subsequent precipitation from solution. Hence, any compound exhibiting the required electron donating qualities for effectuating the desired screening effect may be used as the stabilizer.

Typical compounds which may be used as stabilizers in accordance with this invention include hydroxyaldehydes and hydroxy-ketones and corresponding semiacetals of the aldehydes and ketones. Examples of such compounds are the monosaccharides such as glucose, fructose, mannose, xylose, threose, erythrose, rhamnose; the polysaccharides such as lactose and cellobiose, sugars with straight chains or as substances having oxide rings such as methyl glucoside may also be used. Also, suitable as stabilizers for the purpose of this invention are water soluble alcohols as represented by those having straight chain or cyclic structure such as ethylene glycol, diethylene glycol, triethylene glycol, sorbitol, mannitol and inositol.

Also, operable are water soluble amides such as urea, dimethylformamide; hydroxy-alkyl derivatives of amines containing tertiary nitrogen such as triethanolamine and hydroxyalkyl-alkylenepolyamines such as tetrahydroxyethyl ethylene diamine.

In order to illustrate the invention more specifically, the following examples are given. Unless indicated otherwise, the amounts given are by weight. In the first set of examples which follows, i.e. Examples I to VIII, the orthotitanate which is hydrolyzed is illustrative of the preferred relatively stable type which require a hydrolyzing agent to effect hydrolysis and wherein the orthotitanate may be added to an aqueous medium without requiring a stabilizer to be incorporated therein at the time of addition.

EXAMPLE I 284.0 grams of tetra isopropyl orthotitanate (1 mole) are mixed with 298.4 grams of triethanolamine (2 moles). 120 grams of this mixture (containing .206 mole di-isopropyl-di-triethanolamine titanate) are dissolved in 300 ml. water, and 100 ml. of a 50% solution of methyl glucoside are added. In order to neutralize this mixture, 20 ml. conc. HCl are added. Diluting with water to 600 ml. does not produce hydrolysis sufficient to precipitate insoluble titania.

EXAMPLE II 120 grams of a mixture of 1 mole tetra isopropyl orthotitanate and two moles triethanolamine (containing .206 moles di-isopropyl-di-triethanolamine titanate) are dissolved in 200 ml. water and 200 ml. of a 50% solution of urea are added. The resulting mixture is neutralized with 25 ml. conc. HCl and diluted with water to 600 ml.

EXAMPLE III 10 grams of a mixture of one mole tetra isopropyl orthotitanate and two moles triethanolamine (containing 0.0172 mole di-isopropyl-di-triethanolamine titanate) are mixed with 20 ml. of a 50% aqueous solution of methylglucoside and 20 ml. of N—NaOH. The obtained mixture remains clear over five hours and form a gel after 20 hours.

Without the addition of methylglucoside, insoluble titania precipitates immediately from the solution.

EXAMPLE IV 10 grams of a mixture of one mole tetra isopropyl orthotitanate, and two moles triethanolamine (containing 0.0172 mole di-isopropyl-di-triethanolamine titanate) are diluted with 20 ml. water and 20 ml. of a 50% solution of methylglucoside are added. Upon addition of 20 ml. conc. ammonia, the obtained mixture remains clear for four weeks. After this time the solution becomes viscous.

Without adding methylglucoside, a viscous solution is formed quickly and a solid water-insoluble gel precipitates after two hours.

EXAMPLE V 10 grams of a mixture of one mole tetra isopropyl orthotitanate and two moles triethanolamine (containing 0.0172 mole di-isopropyl-di-triethanolamine titanate) are dissolved in 10 ml. water and corresponding amounts (0.0172 mole) of the following sugars or derivatives are added:

Amount of stabilizer added:

| Grams | ml. 20% solution | |
| --- | --- | --- |
| 3.37 | 16.85 | Methylglucoside. |
| 3.09 | 15.5 | Glucose. |
| 3.09 | 15.5 | Mannose. |
| 3.13 | 15.7 | Rhamnose. |
| 3.09 | 15.5 | Galactose. |
| 3.09 | 15.5 | Levulose. |
| 6.18 | 30.9 | Lactose. |
| 6.18 | 30.9 | Maltose. |
| 5.87 | 29.4 | Sucrose. |

In order to neutralize these mixtures, 5 ml. conc. hydrochloric acid (1:1) are added. The obtained solutions are diluted with water to 50 ml.

The obtained neutral solutions are stable for one or two days. Their stability over a longer period of time is listed in the following Table I:

Table I.—Stability of solutions

| Stabilizing Additive | After 72 hours | After 86 hours | After 98 hours |
|---|---|---|---|
| Methylglucoside | white thick gel | same | same |
| Glucose | still liquid | gelatinous | same |
| Mannose | same | same | same |
| Rhamnose | same | same | same |
| Galactose | Tyndall effect | same | same |
| Levulose | dark yellow, clear | same | same |
| Lactose | same | same | same |
| Maltose | same | slight Tyndall | same |
| Sucrose | thick | thick | same |
| None (blank) | precipitated after a few minutes | thick gel | same |

With three times as much stabilizer added (0.051 mole), solutions obtained are practically infinitely stable. Solutions stabilized with maltose, mannose, galactose, fructose, or rhamnose remain stable over a period of four months.

Without a stabilizing additive, immediate precipitation occurs upon neutralization and dilution.

EXAMPLE VI

To 10 grams of a mixture of one mole tetra-isopropyl-orthotitanate and two moles triethanolamine (0.0172 mole di-isopropyl-di-triethanolamine titanate) are added 2.14 grams ethyleneglycol (0.0344 mole). After addition of 20 ml. water, the obtained mixture is neutralized with hydrochloric acid and diluted with water to 50 ml. The solution is stable.

In a similar manner, corresponding amounts of diethyleneglycol, triethyleneglycol, 1,4 butanediol and 1,5-pentanediol can be used instead of ethyleneglycol, and stable neutral solutions are obtained which contain soluble titania in a highly reactive form.

EXAMPLE VII

To 10 grams of a mixture of one mole tetra-isopropyl orthotitanate and two moles triethanolamine (0.0172 mole di-isopropyl-di-triethanolamine titanate) are added 5 grams (0.0172 mole) N,N,N',N'-tetra (2-hydroxypropyl) ethylene diamine (Quadrol) dissolved in 10 ml. water. The obtained solution is stable after neutralization.

EXAMPLE VIII

To 10 grams of a mixture of one mole tetra-isopropyl-orthotitanate and four moles triethanolamine (0.0131 mole tetratriethanolamine titanate) are added 3.9 grams triethanolamine (0.026 mole) .20 ml. of water are added and, after neutralization, the obtained solution is diluted with water to 50 ml. The obtained mixture remains stable.

Without adding an excess of triethanolamine, a neutralized aqueous solution of tetra-triethanolamine titanate precipitates insoluble titania quickly.

The stability of a water-soluble titanium ester to hydrolysis can be measured indirectly by light transmittance. Typical curves of the light transmittance of a number of solutions prepared in accordance with this invention are shown in Figs. 1–6 of the drawings. The procedure used in preparing the afore-mentioned solutions was as follows:

A 20% aqueous solution of di-isopropyl-di-triethanolamine titanate (obtained by mixing one mole tetra-isopropyl orthotitanate with two moles triethanolamine) was prepared. This 20% solution was then neutralized to a pH about 7 with hydrochloric acid. This solution becomes opaque quickly, showing the Tyndall phenomenon. Upon dilution, insoluble titania will precipitate immediately. After addition of a stabilizer of the present invention, the same solution can be neutralized with concentrated acid and no precipitation will occur. Even after dilution, it will remain clear and slowly will develop highly reactive titania, which remains water soluble over a reasonable length of time.

The advantages obtained by using a stabilizer in accordance with this invention is clearly shown by the light transmittance curves illustrated in Fig. 7 comparing the above mentioned 20% aqueous neutralized di-isopropyl-di-triethanolamine titanate (Solution A) with a 10% aqueous neutralized solution stabilized with five moles urea per mole titania (Solution B). From Fig. 1, it is seen that the light transmittance of Solution B containing the stabilizer urea is higher for a given period of time than the light transmittance of solution A containing no stabilizer.

In Fig. 2, there is shown typical curves of the light transmittance of (1) Solution A, which as indicated heretofore is di-isopropyl-di-triethanolamine orthotitanate neutralized solution, (2) Solution B which is Solution A stabilized with 0.8 mole dextrose per mole titania and (3) Solution C which is Solution A stabilized with 0.8 mole lactose per mole titania.

In Fig. 3 there are shown various solutions of 10% solution of di-isopropyl-di-triethanolamine titanate; Solution A being stabilized with 0.8 mole dextrose, Solution B being stabilized with 0.8 mole lactose, and Solution C being stabilized with 0.8 mole methylglucoside per mole titania.

Comparing Figs. 1–3, it is seen that a much smaller amount (0.8 mole) of stabilizer (dextrose or lactose) may be used for stabilizing a 10% solution than is required for urea (5 moles) in exerting a similar protective dose for a 20% solution. When the solution is a 10% solution, however, the same amount (0.8 mole) of dextrose or lactose is far less effective while the same amount of methyl glucoside (0.8 mole) is very effective in stabilizing the dilute 10% titania solution for a relatively long period of time.

In Fig. 4 there are illustrated typical curves of light transmittance for four 10% di-isopropyl-di-triethanolamine titanate solutions containing varying amounts of mannose. From this figure it is seen that a higher stabilizing action is effectuated when the ratio of mannose to titanium is higher.

It has been found that the epimeric sugar stabilizers glucose, mannose, and fructose undergo the Lobry de Bruyn transformation when they are allowed to stand with the alkaline amine titanate solution, before neutralization is performed. Using this method, highly stable titania solutions are obtained with glucose as indicated by the curves shown in Fig. 5 showing the light transmittance of 20% aqueous solutions of di-isopropyl-di-triethanolamine orthotitanate stabilized with glucose (mole ratio titania; glucose 1:1) wherein in Solution A the solution was neutralized immediately, Solution B after one day and in Solution C the solution was neutralized after two days.

There is no direct relationship between the number of hydroxy groups in the sugar and the stability of the titania solution. The steric arrangement of the hydroxy groups is more important. The pyranoses, glucose and mannose, which both have a six-atom ring, exhibit strikingly different stabilizing effects, although they differ only in the configuration of the carbon atom adjacent to the reducing group.

In Fig. 6 there are shown graphic curves of the light transmittance of di-isopropyl-di-triethanolamine orthotitanate solutions using polyhydric alcohols such as sorbitol and mannitol as stabilizers compared with the sugars mannose, lactose, dextrose and methylglucoside. Again the steric arrangement of the hydroxy groups is more important than their number.

From the foregoing, it is seen that the amount of stabilizers used varies over a wide range depending upon the particular stabilizer employed and the concentration of the water soluble titanate solution. In general, the stabilizer is in an amount from 0.1 mole to 10 moles per mole titania present in the solution.

Additional examples of stabilized solutions prepared from the preferred orthotitanates are as follows:

EXAMPLE IX 284.0 grams isopropyl-orthotitanate are mixed with 420.56 grams of 2-amino-2-methyl-1,3-propanediol (4 moles), 120 grams of this mixture (containing .172 mole of tetra-2-amino-2-methyl-1,3-propanediol titanate) are dissolved in 300 ml. water and 100 ml. of a 50% solution of methyl glucoside are added. The obtained mixture is then neutralized with hydrochloric acid and diluted with water to 600 ml.

EXAMPLE X 284 grams isopropylorthotitanate (1 mole) are mixed with 476.62 grams 2-amino-2-ethyl-1,3 propanediol (4 moles), 120 grams of this mixture (containing .160 mole tetra-2-amino-2-ethyl-1,3-propanediol titanate) are dissolved in 300 ml. water and 100 ml. of a 50% solution of methyl-glucoside are added. The obtained mixture is neutralized with hydrochloric acid and diluted with water to 600 ml.

The following Examples XI to XVII disclose the preparation of a number of orthotitanates which may be used in forming the novel stabilized titanium solutions of this invention.

EXAMPLE XI

Tetra-aminoethyl ethanolamine titanate is prepared as follows:

14.2 grams of tetra-isopropyl orthotitanate (0.05 mole) are mixed with 20.8 grams of aminoethyl-ethanolamine (0.2 mole).

EXAMPLE XII

Di-isopropyl-di-amino-ethyl ethanolamine titanate is prepared as follows:

14.2 grams of tetra-isopropyl orthotitanate (0.05 mole) are mixed with 10.4 grams of aminoethyl-ethanolamine (0.2 mole).

EXAMPLE XIII

Tetra-diisopropanolamine titanate is prepared as follows:

14.2 grams of tetra-isopropyl-orthotitanate (0.05 mole) are mixed with 26.6 grams diisopropanolamine (0.2 mole).

EXAMPLE XIV

Tetra-methyldiethanolamine titanate is prepared as follows:

14.2 grams tetra isopropylorthotitanate (0.05 mole) are mixed with 23.8 grams methyl-diethanolamine (0.2 mole).

EXAMPLE XV

Di-isopropyl-dimethyldiethanolamine titanate is prepared as follows:

14.2 grams tetra-isopropyl orthotitanate (0.05 mole) are mixed with 11.9 grams methyl-diethanolamine (0.1 mole).

EXAMPLE XVI

Tetra-diethyl-ethanolamine titanate is prepared as follows:

14.2 grams tetra isopropylorthotitanate (0.05 mole) are mixed with 23.4 grams diethyl-ethanolamine (0.2 mole).

EXAMPLE XVII

Tetra-triisopropanolamine titanate is prepared as follows:

14.2 grams of tetra-isopropyl-orthotitanate (0.05 mole) are mixed with 38.2 grams triisopropanolamine (0.2 mole).

Examples are now given of a number of stabilized solutions employing an orthotitanate which is relatively unstable. In such instances, hydrolysis occurs when the orthotitanate is added to the aqueous medium without the necessity of a hydrolyzing agent. Moreover, the aqueous medium to which the orthotitanate is added must contain a stabilizer. Otherwise the hydrolyzed product would immediately precipitate out of solution.

EXAMPLE XVIII 5.7 grams (0.02 mole) tetra-isopropyl orthotitanate are mixed with 7.1 grams (0.08 mole) 2-amino-1-butanol. The resulting clear mixture containing tetra-2-amino-1-butanol orthotitanate (0.02 mole) is not soluble in water, but it dissolves in a 50% aqueous solution of methylglucoside. This solution precipitates polymerized titania upon dilution with much water.

EXAMPLE XIX 7.1 grams (0.025 mole) tetra-isopropyl orthotitanate are mixed with 10.6 grams (0.10 mole) diethylene glycol. A clear yellow mixture, containing tetra-diethylene glycol orthotitanate (0.025 mole) results (heat reaction) which is miscible with 50% aqueous solution of methylglucoside but which is insoluble in plain water.

EXAMPLE XX 14.2 grams (0.05 mole) tetra-isopropyl orthotitanate are mixed with 36.9 grams (0.3 mole) 2-ethanol-pyridine. The mixture (reaction heat) containing tetra-2-ethanol pyridine orthotitanate (0.05 mole) is insoluble in water but dissolves in 50% aqueous methylglucoside solution.

In the same manner, isopropyl orthotitanate can be reacted with 2-propanol-pyridine or 4-propanol-pyridine. The reaction product dissolves in aqueous methylglucoside solution, but not in plain water.

EXAMPLE XXI 28.4 grams (0.1 mole) tetra-isopropyl orthotitanate are mixed with 10.5 grams (0.1 mole) diethanolamine. The reaction product (containing mono-diethanolamine triisopropyl orthotitanate (0.1 mole)) does not form a clear stable solution in plain water, but it dissolves in 20% aqueous solution of methylglucoside.

A solution thus prepared can be neutralized without precipitating polymerized titania.

EXAMPLE XXII 7.1 grams (0.025 mole) tetra-isopropyl orthotitanate are mixed with 18.7 grams (0.1 mole) dicyanoethylethanolamine obtained by cyanoethylation of one mole monoethanolamine with two moles acrylonitrile.

The resulting clear mixture containing tetra-dicyanoethylethanolamine orthotitante (0.25 mole) is insoluble in water but soluble in aqueous solution of methylglucoside.

EXAMPLE XXIII

To 2.82 grams (0.0176 mole) triethanolamine are added 5.0 grams (0.0176 mole) tetra-isopropyl orthotitanate. The mixture containing mono-triethanolamine tri-isoproply orthotitanate (0.0176 mole) is cooled and 20 mls. of a 50% aqueous solution of methylglucoside are added. The resulting solution it titrated with 5.395 N HCl (HCl:water=1:1)

1.7 ml. are needed to reach pH—7.

In the absence of methylglucoside or another proper stabilizer, it is impossible to dissolve mono-triethanolamine orthotitanate in water or to neutralize the obtained mixture.

EXAMPLE XXIV 10 mls. (0.0345 mole) tetra-isopropyl orthotitanate are added to a mixture of 14 mls. (.13 mole) diethylamine and grams methylglucoside. A moist powder forms which clearly dissolves in 20 ml. water.

Without methylglucoside, a mixture of isopropyl orthotitanate and diethylamine forms a precipitate upon dilution with water.

The stable aqueous solutions of the present invention make it possible to carry out reactions with monomer or low polymer of orthotitanic acid or esters thereof in aqueous systems. Among the possible applications of the solutions of this invention are:

(1) Cross-linking of cellulose, preparation of wet strength papers which do not contain formaldehyde.

(2) Combination of cellulose with other compounds which contain water absorbed in the surface.

(3) Combination of cellulose with other compounds which contain water absorbed in the surface. Retention of fillers, pigments, water-dispersible resins.

(4) Solidification of sand and inorganic pigments, preparation of dielectric (artificial mica).

(5) Precipitation of fiber and dirt particles from spent liquors.

(6) Preparation of base exchange materials.

Among the materials which can be made by cross-linking cellulose and similar materials such as asbestos and by surface treatment of fibrous materials with titania are: wet strength and wet stiff papers and card board, which are used for maps, tissues, bags, as insulating materials; for highway construction; and for electrotechnical purposes. Titania imparts initial wet strength to paper.

Among the materials which can be affixed to fibrous substances are the following: loading and filling materials (clays, diatomaceous earths, pigments), coloring materials, sizing materials (glues, starches, casein), plasticizing materials, etc.

The use of stabilized titania is particularly necessary, when large amounts of titania are to react. In this case, longer reaction times are involved and polymerization to metatitanic acid has to be prevented. Reactions of cellulose with unstabilized titania reveal losses by polymerization in the range of 50% and more.

The invention in its broader aspects in not limited to the specific steps, processes and compositions described but departures may be made therefrom within the scope of the accompanying claims without departing from the principles of the invention and without sacrificing its chief advantages.

What is claimed is:

1. A process for controlling the hydrolysis of a water soluble orthotitanate ester and for preserving the resulting hydrolyzed reaction product in the form of a water soluble low molecular weight compound selected from the group consisting of monomers and polymers of orthotitanic acid and partially hydrolyzed esters of orthotitanic acid, comprising hydrolyzing said orthotitanate ester in an aqueous medium and inhibiting polymerization of the hydrolyzed product by incorporating in said aqueous medium a stabilizer containing an electron donating atom and selected from the group consisting of hydroxyaldehydes, hydroxy-ketones, semi-acetals of hydroxyaldehydes, water-soluble alcohols, water soluble amides, hydroxy-alkyl derivatives of amines containing tertiary nitrogen, and hydroxyalkyl-alkylenepolyamines.

2. A process according to claim 1 wherein the orthotitanate ester is relatively stable in water and in which said orthotitanate ester is hydrolyzed by adding a hydrolyzing agent to said aqueous medium, said hydrolyzing agent being selected from the group consisting of hydrochloric acid, hydrobromic acid, perchloric acid, sulfuric acid, phosphoric acid, boric acid, formic acid, acetic acid, trifluoroacetic acid, perfluorobutyric acid, cyanoacetic acid, chloroacetic acid, trichloroacetic acid, maleic fumaric acid, succinic acid, polyacrylic acid, thioglycolic acid thiomalic acid, carboxymethylmercaptosuccinic acid, toluene sulfonic acid, sulfanilic acid, sodium hydroxide, potassium hydroxide, ammonium hydroxide, ethyl amine, diethyl amine, pyridine, piperidine and cyclohexylamine.

3. A process according to claim 1 wherein the orthotitanate ester is relatively unstable in water and hydrolyzed upon addition to water and wherein the stabilizer is added to the aqueous medium prior to the addition of the orthotitanate ester thereto.

4. A process in accordance with claim 1 wherein the orthotitanate ester is chelated amine titanate.

5. A process in accordance with claim 4 wherein the orthotitanate ester is an alkanolamine titanate.

6. A process in accordance with claim 4 wherein the stabilizer is a hydroxyaldehyde.

7. A process in accordance with wtih claim 4 wherein the stabilizer is a hydroxyketone.

8. A process in accordance with claim 4 wherein the stabilizer is an alcohol.

9. A process in accordance with claim 4 wherein the stabilizer is an amide.

10. A process in accordance with claim 4 wherein the stabilizer is a hydroxyalkyl derivative of an amine.

11. A stable aqueous solution consisting essentially of a major amount of water, a titanium derivative in the form of an agent selected from the group consisting of stable monomers and water soluble low molecular weight polymers of orthotitanic acid and partially hydrolyzed orthotitanic esters in a highly reactive form, and a stabilizer containing an electron donating atom and selected from the group consisting of water soluble hydroxyaldehydes, hydroxy-ketones, semi-acetals of hydroxyaldehydes, water-soluble alcohols, water-soluble amides, hydroxyalkyl derivatives of amines containing a tertiary nitrogen, and hydroxyalkyl alkylene polyamines.

12. A stable aqueous solution as set forth in claim 11 wherein the titanium derivative is orthotitanic acid.

References Cited in the file of this patent

UNITED STATES PATENTS

| | | |
|---|---|---|
| 2,147,533 | Katzoff | Feb. 14, 1939 |
| 2,680,108 | Schmidt | June 1, 1954 |
| 2,689,858 | Boyd | Sept. 21, 1954 |